(12) United States Patent
Staiger et al.

(10) Patent No.: US 11,022,229 B2
(45) Date of Patent: Jun. 1, 2021

(54) VALVE WITH NONMAGNETIZABLE DIVIDING RING

(71) Applicant: STAIGER GMBH & CO. KG, Erligheim (DE)

(72) Inventors: Marc Staiger, Ludwigsburg (DE); Peter Kofink, Obersulm (DE); Klaus Schoch, Talheim (DE)

(73) Assignee: STAIGER GMBH & CO. KG, Erligheim (DE)

( * ) Notice: Subject to any disclaimer, the term of this patent is extended or adjusted under 35 U.S.C. 154(b) by 0 days.

(21) Appl. No.: 16/478,635

(22) PCT Filed: Jan. 18, 2018

(86) PCT No.: PCT/EP2018/051156
§ 371 (c)(1),
(2) Date: Jul. 17, 2019

(87) PCT Pub. No.: WO2018/134283
PCT Pub. Date: Jul. 26, 2018

(65) Prior Publication Data
US 2019/0346056 A1    Nov. 14, 2019

(30) Foreign Application Priority Data

Jan. 19, 2017 (DE) .................... 10 2017 000 446.3

(51) Int. Cl.
*F16K 31/06* (2006.01)
*F16K 27/02* (2006.01)

(52) U.S. Cl.
CPC ........ *F16K 27/029* (2013.01); *F16K 31/0655* (2013.01); *F16K 31/0658* (2013.01); *F16K 31/0675* (2013.01)

(58) Field of Classification Search
CPC .............. F16K 27/029; F16K 31/0655; F16K 31/0675; F16K 31/0658
(Continued)

(56) References Cited

U.S. PATENT DOCUMENTS 1,664,612 A * 4/1928 French ............... F02M 51/0653
239/585.3
2,374,895 A * 5/1945 Ray ..................... F16K 31/0658
251/129.16
(Continued)

FOREIGN PATENT DOCUMENTS

DE        20120608 U1    4/2003
DE        10256754 A1    7/2004
(Continued)

OTHER PUBLICATIONS

International Preliminary Report on Patentability and Written Opinion for corresponding PCT application PCT/EP2018/051156 dated Jul. 23, 2019.

(Continued)

*Primary Examiner* — John Bastianelli
(74) *Attorney, Agent, or Firm* — Stephen T. Olson; Harness, Dickey & Pierce, P.L.C.

(57) ABSTRACT

A valve for gaseous and liquid media comprises a valve body, a flat armature, and an electrically controllable magnetic head having an electromagnet, an inner core, an outer core, and a dividing ring arranged between the latter, the end face part of which, together with a front face of the outer core, forms a stop surface for the flat armature on one and the same plane.

22 Claims, 2 Drawing Sheets

Figure 4:
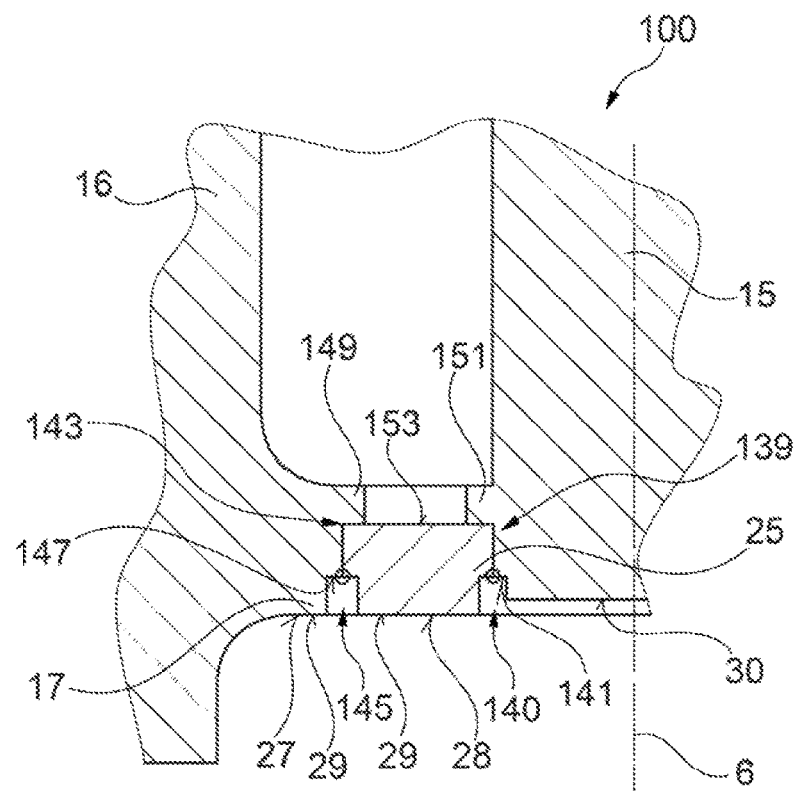

(58) Field of Classification Search
USPC .................................... 251/129.16, 284
See application file for complete search history.

(56) References Cited

U.S. PATENT DOCUMENTS

| | | | | |
|---|---|---|---|---|
| 4,588,162 | A * | 5/1986 | Moffat | F16K 31/0627 137/625.65 |
| 4,905,962 | A * | 3/1990 | Iljin | F16K 31/0682 239/585.3 |
| 5,238,224 | A * | 8/1993 | Horsting | F02M 51/005 239/585.3 |
| 7,159,843 | B1 * | 1/2007 | Mullally | F16K 31/0651 251/129.16 |
| 2006/0017034 | A1 | 1/2006 | Fukano et al. | |

FOREIGN PATENT DOCUMENTS

| | | |
|---|---|---|
| DE | 10340941 A1 | 3/2005 |
| DE | 102006012530 A1 | 9/2007 |
| DE | 202008015377 U1 | 4/2009 |
| DE | 102006012530 B4 | 6/2009 |
| DE | 202015004290 U1 * | 7/2015 |
| DE | 202015004290 U1 | 7/2015 |
| EP | 2561197 A2 | 2/2013 |

OTHER PUBLICATIONS

International Search Report (in English and German) and Written Opinion (in German) issued in PCT/EP2018/051156, dated May 15, 2018; ISA/EP.

* cited by examiner

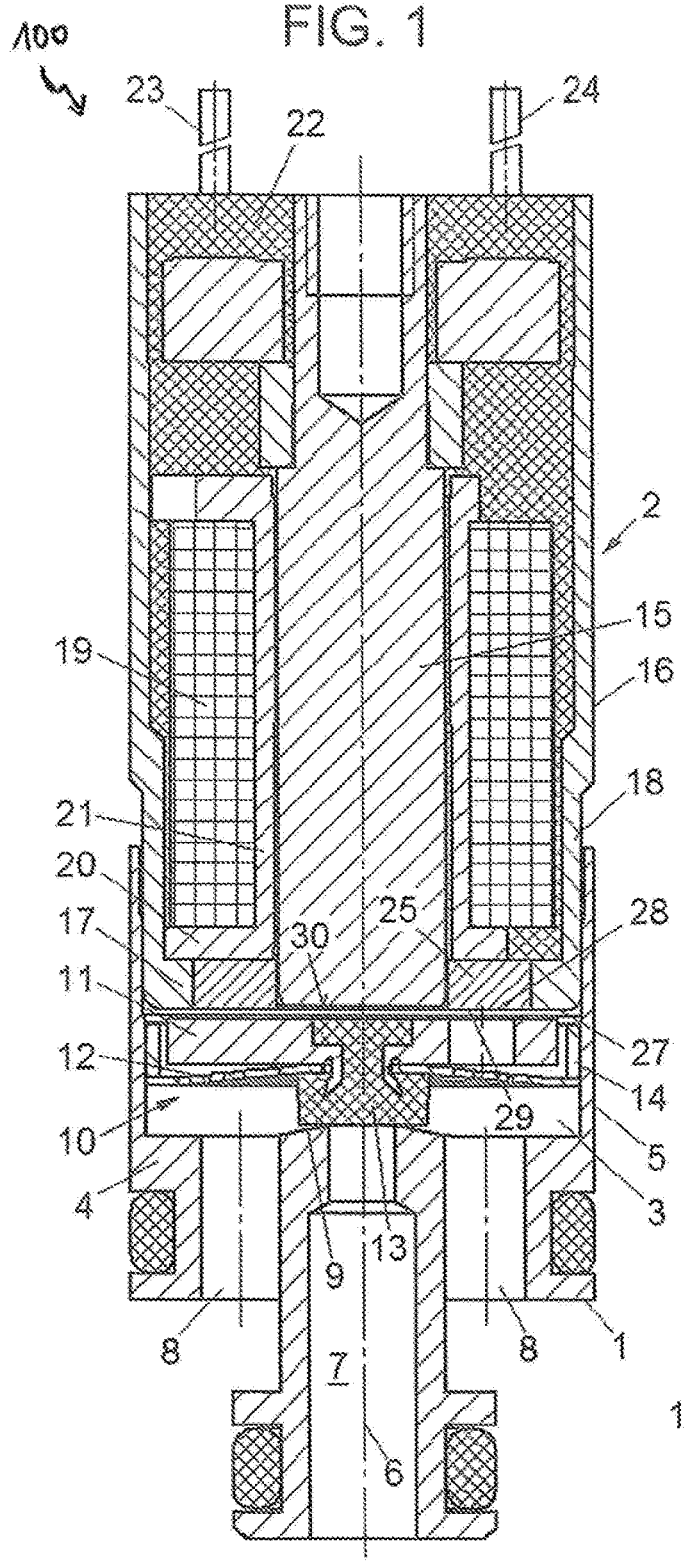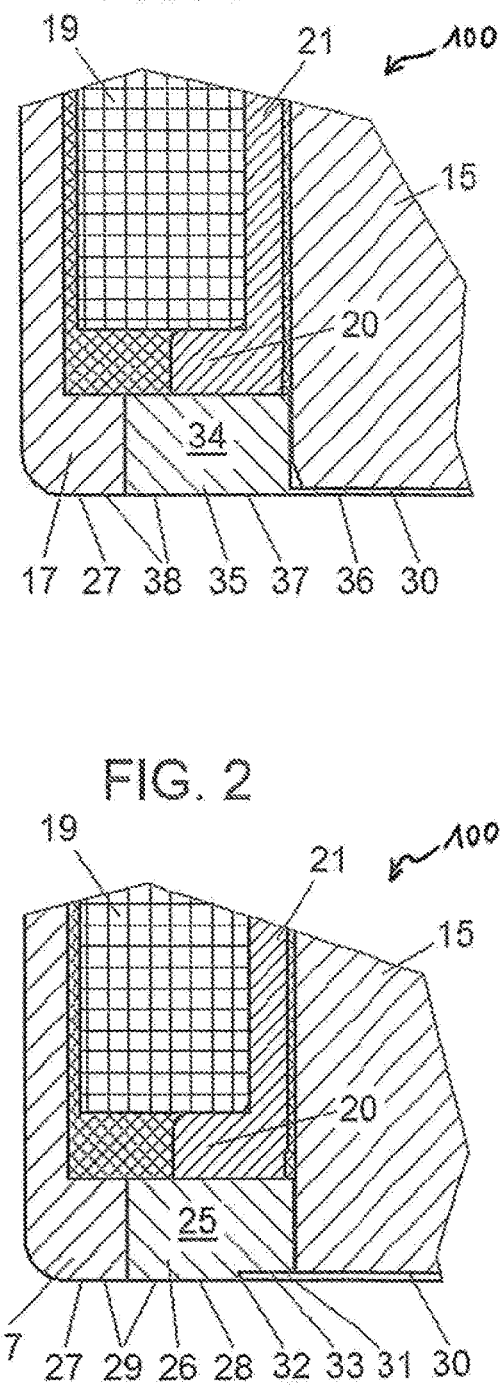

VALVE WITH NONMAGNETIZABLE DIVIDING RING

CROSS-REFERENCE TO RELATED APPLICATIONS

This application is a 371 U.S. National Stage of International Application No. PCT/EP2018/051156, filed Jan. 18, 2018, which claims priority to German Patent Application No. 10 2017 000 446.3, filed Jan. 19, 2017. The entire disclosures of the above applications are incorporated herein by reference.

FIELD

The invention relates to a valve having a nonmagnatizable dividing.

BACKGROUND

DE 10 2006 012 530 B4 discloses a generic valve whose magnetic head between an inner core and an outer core has a nonmagnetizable dividing ring, which is set back on the side facing the flat armature. The arrangement is such that, when the magnetic head is activated, the armature disk associated with the flat armature strikes a front face of the outer core exclusively with a narrow edge surface of its upper side facing the magnetic head. As a result, relatively high stress occurs in this narrow contact area which may lead to material wear and malfunction, especially at a high switching frequency of the valve.

SUMMARY

The object of the invention is to develop a valve of this type to the effect that the disadvantages described above are largely avoided and large-area abutment of the magnet armature and a permanently reliable functionality can be achieved with simple means.

Preferably, a front face of the outer core corresponding to the armature disk and an end face part of the dividing ring facing the armature disk form a stop surface in the same plane.

Preferably, the front face of the inner core facing the armature disk is set back at a distance from the plane of the stop plane.

One embodiment of the invention provides that the dividing ring has a bottom wall and an annular wall, wherein the end of the inner core facing the flat armature is—preferably positively—positioned in the dividing ring such that the end wall of the inner core is overlapped by the bottom wall. In this case, the surface of the bottom wall of the dividing ring facing the armature disk is preferably arranged in the plane of the front face of the outer core and the end face part of the annular wall and co-forms the stop surface. In this way, the inner core is protected mechanically, and a further enlarged stop surface is advantageously provided by the bottom wall at the same time so that a particularly large-area stop of the magnet armature and a particularly reliable, permanent functionality are provided.

According to one embodiment of the invention, the end wall of the inner core abuts the bottom wall of the dividing ring. This is a particularly space-saving design on the one hand, and the bottom wall is also advantageously stabilized by the end wall of the inner core on the other hand.

According to a further embodiment of the invention it is provided that an axial clearance is formed in a—radial—contact area between the dividing ring and the inner core which has a welding surface that is axially recessed relative to the stop surface toward the magnetic head.

Alternatively or additionally, an axial clearance is preferably formed in a—radial—contact area between the dividing ring and the outer core which has a welding surface that is axially recessed relative to the stop surface in the direction of the magnetic head.

Particularly preferable is that an axial clearance is formed both in a first contact area between the dividing ring and the inner core and in a second contact area between the dividing ring and the outer core which has a welding surface that is axially recessed relative to the stop surface in the direction of the magnetic head.

The term "recessed" means in particular that a surface is offset relative to the stop surface in the direction of the magnetic head, in particular in the direction of the electromagnet, along a longitudinal or center axis of the valve.

The at least one axial clearance preferably extends in the axial direction—that is to say in particular along the longitudinal or center axis of the valve—across an area that is smaller than an axial extension of the dividing ring, in particular smaller than an axial extension of the first contact area and/or the second contact area. Thus, the at least one contact area, when viewed in the axial direction, is effectively shortened by the at least one axial clearance but not eliminated.

By means of the at least one recessed welding surface, an axially recessed welded connection is made possible which requires no additional material or reworking. By means of a specifically designed welding geometry, it is possible to weld very precisely and in a defined manner, even with a greatly reduced energy supply, for example by means of a laser beam. The greatly reduced energy supply ensures that the heat input is very low, which largely avoids any heat distortion. The front faces, in particular the stop surface, no longer has to be reworked after welding the dividing ring to the inner core and/or the outer core so that they can be manufactured very precisely with little effort.

The contact area between the dividing ring and the outer core is preferably a contact area between the dividing ring and an inner collar of the outer core. The dividing ring is thus preferably in contact in particular, on the one hand, with the inner collar of the outer core and, on the other hand, with the inner core.

A contact area is generally understood to refer to an area in which the dividing ring is in contact with a touching, immediately adjacent element, in particular with the inner core or with the outer core. In particular, the contact area may have—preferably concentric—contact surfaces of the dividing ring on the one hand and of the adjacent component on the other hand, in particular of the inner core and/or the outer core, with the contact surfaces of the various components lying flat against each other. The contact surfaces preferably have a circular, cylindrical shape.

The stop surface is interrupted, in particular in the area of the at least one axial clearance. However, since the axial clearance can have only a small extension—seen in the radial direction—this does not harm the large-area design of the stop surface, or at least not significantly and at the same time, the advantages mentioned above in connection with the attachment of the dividing ring to the adjacent components can be achieved.

The stop surface is preferably also recessed relative to the end wall of the inner core, which in turn is preferably recessed relative to the stop surface.

According to a further embodiment of the invention, the at least one axial clearance is designed as an undercut. In this way, the axial clearance can be produced in a particularly simple, precise, and inexpensive manner, in particular as an undercut that is concentric with the center axis.

Alternatively or additionally, the at least one axial clearance is preferably designed as an annular groove, in particular as an annular groove that is concentric with the center axis. This also represents a particularly simple and moreover geometrically advantageous design of the axial clearance.

Preferably, both axial clearances are formed as mutually concentric undercuts, in particular as mutually concentric annular grooves.

According to a further embodiment of the invention, the at least one welding surface is a bottom surface of the at least one axial clearance. This represents a design of the welding surface that can be produced in a particularly simple, fast, and inexpensive manner wherein the axial clearance has no complex geometry. The welding surface may, in particular, be formed as a groove bottom of an axial clearance formed as an annular groove.

According to a further embodiment of the invention, mutually contacting and axially aligned weld projections of the dividing ring on the one hand and the inner core on the other hand, and/or the dividing ring on the one hand and the outer core on the other hand, are arranged in the at least one axial clearance with the weld projections forming the welding surface, in particular when taken together. In this way, a detailed welding geometry can be provided that matches the specific requirements of the valve which, in particular, allows for welding with a greatly reduced power supply—for example by means of a laser beam—but at the same time for very accurate and defined welding. The energy supply that is greatly reduced in this regard leads to a very low heat input, whereby any heat distortion can be largely avoided. The weld projections extend in particular from a bottom surface of the at least one axial clearance, in particular from a groove bottom thereof, in the axial direction towards the flat armature. The welding surface is axially recessed relative to the stop surface and preferably also relative to the end wall of the inner core, but by a smaller amount than the bottom surface of the axial clearance from which the weld projections protrude. The weld projections preferably have a radial distance to the side walls of the axial clearance so that they virtually protrude—when viewed in the radial direction—as freestanding protrusions from the bottom surface of the axial clearance.

Finally, according to a further embodiment of the invention it is provided that the outer core, in particular the inner collar of the outer core, and the inner core each have a radial projection wherein the dividing ring arranged between the outer core and the inner core abuts at the radial projections with a rear surface. In particular, the outer core has a first radial projection which extends inwards in the radial direction, preferably starting from the inner collar, in the direction of the inner core. The inner core has a second radial projection which extends outward in the radial direction, preferably in the direction of the inner collar of the outer core. Preferably, the radial projections—viewed in the radial direction—are spaced from each other so they do not touch each other. The radial projections are preferably aligned with one another when viewed in the axial direction.

At least one of the two radial projections is preferably circumferentially formed when viewed in the circumferential direction. Preferably, both radial projections are circumferentially formed in the circumferential direction. In particular, it is possible that at least one of the two radial projections is formed as a circumferential shoulder. Preferably, both radial projections are formed as circumferential shoulders.

Due to the fact that the dividing ring is supported on the radial projections of the outer core on the one hand and the inner core on the other hand, this ring and thus also the valve as a whole has an increased pressure stability so that it is preferably suitable for high-pressure applications.

A rear surface of the dividing ring means a surface on which the center axis is positioned in an inclined, preferably vertical, manner and that faces the electromagnet. The dividing ring is supported in particular on its rear surface by the radial projections. In this way, a specific axial position of the dividing ring is ensured so that it can be securely and reproducibly connected to the outer core on the one hand and the inner core on the other hand.

Figure 5:
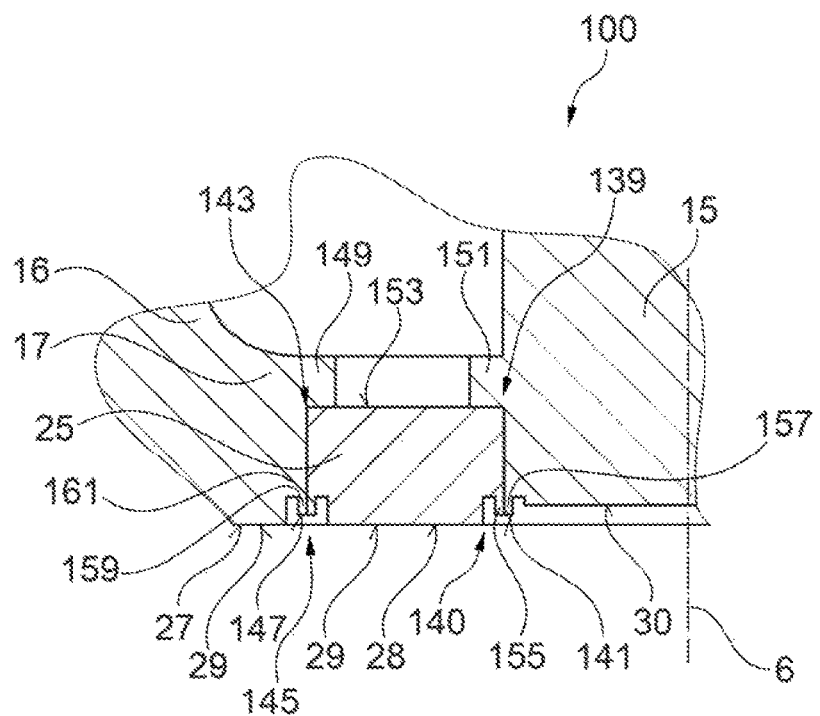

Further advantages and important details of the invention will become apparent from the following description and the drawing which shows preferred embodiments in a schematic representation. The figures show the following:

FIG. 1 shows a first embodiment of the valve in an enlarged representation in a sectional side view, FIG. 2 shows a further enlarged representation of a valve detail of FIG. 1 according to a second embodiment, FIG. 3 shows a valve detail similar to FIG. 2, but according to a third embodiment, FIG. 4 shows a valve detail according to a fourth exemplary embodiment of the valve, and FIG. 5 shows a valve detail of a fifth embodiment of the valve.

DETAILED DESCRIPTION

The valve 100 illustrated in the drawing is provided for gaseous and liquid media. It is essentially designed as a circular, cylindrical body and essentially has a valve body 1 and a magnetic head 2 connected thereto. In the valve body 1, a valve chamber 3 is formed which is partially delimited by a base wall 4 and a peripheral wall 5. A coaxially arranged inlet 7 and an outlet 8 connected to the valve chamber 3 are provided for the medium in the base wall 4 of the valve body 1 with respect to a center axis 6 of the valve. The mouth of the inlet 7 leading to the valve chamber 3 is designed as a valve seat 9.

An axially displaceable flat armature 10 which has, coaxially to the center axis 6, an armature disk 11 which is penetrated by a through hole, a disk-shaped spring 12, and a sealing pin 13 made from rubber-elastic material, which are combined to form a unit, are located in the valve chamber 3. The sealing pin 13 is arranged on the side of the flat armature 10 facing away from the magnetic head 2 and corresponds to the valve seat 9. The spring 12 is fixed at its middle area between the side of the armature disk 11 facing away from the magnetic head 2 and the sealing pin 13, wherein clawlike-shaped bends may be embedded in the sealing pin 13 for a secure attachment. The flat armature 10 is fixed in place in the valve chamber 3 with an annular bushing 14.

The magnetic head 2 has, with respect to the center axis 6, an inner core 15 shaped as a round rod and a substantially tubular outer core 16 which, at its end facing the flat armature 10, has an inner collar 17 extending radially in the direction of the inner core 15. The outer core 16 forms the outer shell of the magnetic head 2 and may have a peripheral portion 18 that is slightly reduced in diameter.

In addition, the magnetic head 2 includes an electromagnet 19 which is mounted on a bobbin 21 having at least one end flange 20 and which is located therewith in an annular space of the magnetic head 2 delimited by the inner core 15 and the outer core 16. For sealing purposes, an insulating potting compound 22 may be provided, into which the electromagnet 19 and the bobbin 21 in the magnetic head 2 are tightly embedded and which also tightly surrounds the conductor connection parts 23, 24 of the electromagnet 19.

On the underside of the magnetic head 2 facing the flat armature 10, a circular dividing ring 25 is coaxially arranged that has an annular wall 26 and is made of a nonmagnetizable material, preferably a stainless steel. This dividing ring 25 is positioned in the plane of the inner collar 17 associated with the outer core 16 between the same and the inner core 15, wherein the outer peripheral surface of the annular wall 26 abuts firmly against a wall surface of the inner collar 17 and an inner surface of the annular wall 26 corresponds to the outer surface of the inner core 15. The dividing ring 25 is preferably arranged hermetically sealed between the inner collar 17 of the outer core 16 and the inner core 15 by means of press fit or by welding so that the medium cannot penetrate into the magnetic head 2 even at a high operating pressure.

The drawing shows that the end flange 20 of the bobbin 21 on the side of the inner collar 17 facing away from the flat armature 10 side of the inner collar 17 and of the dividing ring 25 abuts the latter or is supported by it. On the side facing the flat armature 10, the end face 27 of the inner collar 17 and an end face part 28 of the dividing ring 25 are formed as a stop surface 29 in one and the same plane on which the top of the armature disk 11 facing the magnetic head 2 comes to bear. The end wall 30 of the inner core 15 facing the armature disk 11 is axially recessed so that a distance or gap exists between the end wall 30 and the plane of the stop surface 29 for a certain reduction of the magnetic holding force in the area of the inner core 15. Incidentally, it can be seen that the axial thickness of the annular wall 26 of the dividing ring 25 is substantially equal to the axial thickness of the inner collar 17.

FIG. 2 shows that in this embodiment a recess 31 is formed in the annular wall 26 of the dividing ring 25 which is circumferentially delimited by an annular surface 32 and whose base surface 33 is axially recessed at a distance from the stop surface 29. It can be seen that the annular surface 32 of the recess 31 is radially offset so far in the direction of the center axis 6 that the radial extension of the end face part 28 of the annular wall 26 is greater than the radial extension of the base surface 33 of the recess 31. Thus, the area of the end face part 28 pertaining to the stop surface 29 is advantageously larger than the recessed base surface 33 of the recess 31.

FIG. 3 shows that, in this advantageous embodiment, the dividing ring 34 is designed such that it is substantially pot-shaped with the annular wall 35 and a bottom wall 36. In this pot, the flat armature 10 facing the end of the inner core 15 is preferably mounted in a form-fit manner, wherein the end wall 30 of the inner core 15 preferably abuts the bottom wall 36. The annular wall 35 and the bottom wall 36 are preferably integrally formed and consist of one and the same material. It can be seen in the drawing that the lower surface of the bottom wall 36 of the dividing ring 35, which faces the armature disk 11, and the end face 27 of the outer core 16 and the end face part 37 of the pot-shaped dividing ring 34 are formed in one and the same plane and together form the relatively large stop surface 38. The thickness of the bottom wall 36 in the axial direction is significantly or many times thinner than the axial thickness of the annular wall 35, wherein it is also advantageous to configure the axial thickness of the bottom wall 36 of the dividing ring 35 such that it is substantially equal to the distance by which the end wall 30 of the inner core 15 is axially recessed relative to the plane of the stop surface 38.

FIG. 4 shows a detailed representation of another embodiment of the valve 100. Same and functionally identical elements are provided with the same reference signs so that reference is made to the previous description in this regard. In the embodiment shown here, a first axial clearance 140 is formed in a first contact area 139 between the dividing ring 25 and the inner core 15, which has a first welding surface 141 that is recessed, when viewed along the center axis 6, relative to the stop surface 29 and also relative to the end wall 30 of the inner core 15.

In a second contact area 143 between the dividing ring 25 and the outer core 16, in particular between the dividing ring 25 and the inner collar 17 of the outer core 16, a second axial clearance 145 is formed, which has a second welding surface 147 that is recessed, when viewed along the center axis 6, relative to the stop surface 29 and here also relative to the end wall 30.

The axial clearances 140, 145 are here formed as undercuts, in particular as concentric annular grooves, which extend in particular concentrically with the center axis 6 and concentrically with each other when viewed in the circumferential direction.

In the fourth embodiment according to FIG. 4, the welding surfaces 141, 147 are each designed as bottom surfaces of the corresponding axial clearance 140, 145.

The inner collar 17 here has a first radial projection 149 which, viewed from the inner collar 17 in the radial direction, extends towards the inner core 15. The inner core 15 in turn has a second radial projection 151 which, viewed in the radial direction, extends from the inner core 15 towards the inner collar 17. The dividing ring 25 is arranged between the inner collar 17 and the inner core 15 and has a rear surface 153 with which it abuts the radial projections 149, 151, and, in particular, is supported by the same.

The radial projections 149, 151 are preferably circumferential when seen in the circumferential direction. It is particularly preferred that they are designed as shoulders, which are circumferential, when seen in the circumferential direction.

Because the dividing ring 25 is supported by the radial projections 149, 151, pressure forces introduced into the dividing ring 25 can be supported on the one hand by the outer core 16 and on the other hand by the inner core 15. As a result, the valve 100 as a whole is particularly suitable for high-pressure applications.

The dividing ring 25 is welded and preferably laser-welded in the area of the welding surfaces 141, 147 to the inner core 15 on the one hand to the outer core 16 on the other hand, in particular with the inner collar 17.

Due to the fact that the welded connection is arranged such that it is axially recessed relative to the stop surface 29, no reworking of the stop surface 29 is required after the welding, which can furthermore be carried out with high precision.

FIG. 5 shows a detailed representation of a fifth embodiment of the valve 100. Same and functionally identical elements are provided with the same reference signs so that reference is made to the previous description in this regard. In the embodiment shown here, axially aligned weld projections 155, 157, 159, 161 are arranged in the axial clearances 140, 145, namely, in the first axial clearance 140 a first weld projection 155 of the dividing ring 25 and a second weld projection 157 of the inner core 15, and in the second axial clearance 145, a third weld projection 159 of the outer core 16, here of the inner collar 17, and a fourth weld projection 161 of the dividing ring 25. The welding surfaces 141, 147 are, in this case, formed on the weld projections 155, 157, 159, 161 and in particular by the weld projections 155, 157, 159, 161, and in particular as axial end faces of the weld projections 155, 157, 159, 161.

As a result, a detailed welding geometry is created which allows for a particularly precise, defined welding with low heat input, preferably by laser welding.

CLAIMS

Since the stop surface 29, 38 of the proposed valve 100 corresponding with the armature disk 11 is relatively large, the mechanical wear on the contact or abutment surfaces is extremely low so that permanently reliable functionality is achieved, which leads to substantial savings in costly protective layers or surface-hardening processes, even at a high switching frequency of the valve 100.

The invention claimed is:

1. A valve for gaseous and liquid media, the valve comprising:
    a valve body with an inlet;
    an outlet;
    a valve chamber;
    a valve seat;
    a flat armature with an armature disk;
    a sealing pin;
    a spring;
    a magnetic head with an electromagnet;
    an inner core;
    an outer core; and
    a nonmagnetizable dividing ring arranged between the inner core and the outer core,
    wherein a front face of the outer core corresponding with the armature disk of the flat armature and an end face part of the nonmagnetizable dividing ring facing the armature disk are formed as a stop surface in one and a same plane, and
    further comprising at least one axial clearance having:
    at least one first welding surface for welding the nonmagnetizable dividing ring to one of the inner core and the outer core in an area of the at least one welding surface, the at least one first welding surface axially recessed relative to the stop surface, and
    a bottom surface axially recessed relative to the slop surface and to a bottom end wall of the inner core,
    weld projections extending from the bottom surface, and
    the at least one first welding surface formed on the weld projections extending from the bottom surface.

2. The valve according to claim 1, wherein an annular wall of the nonmagnetizable dividing ring has a recess adjoining the end face part, the annular wall forming the stop surface having a base surface set back from the stop surface with respect to a center axis.

3. The valve according to claim 2, wherein the end face part of the annular wall of the nonmagnetizable dividing ring also forming the stop surface is greater than the base surface of the recess.

4. The valve according to claim 2, wherein a radial extension of the end face part of the annular wall of the nonmagnetizable dividing ring is greater than a second radial extension of the base surface of the recess.

5. The valve according to claim 2, wherein the end face part of the annular wall of the nonmagnetizable dividing ring is radially wider than the base surface of the recess.

6. The valve according to claim 1, wherein the bottom end wall of the inner core facing the armature disk is set back at a distance to a plane of the stop surface.

7. The valve according to claim 1, wherein the outer core is cylindrical and has, radially in a direction of the inner core, an inner collar on which the front face also forming the stop surface is formed.

8. The valve according to claim 7, wherein an axial thickness of the inner collar of the outer core and the axial thickness of an annular wall of the nonmagnetizable dividing ring are equal.

9. The valve according to claim 7, further comprising a bobbin holding an electromagnet abuts a side of the inner collar of the outer core facing away from the stop surface.

10. The valve according to claim 1, wherein the nonmagnetizable dividing ring is hermetically pressed and/or welded between the outer core and the inner core.

11. The valve according to claim 1, wherein the at least one axial clearance is designed as at least one of an undercut and a concentric annular groove.

12. The valve according to claim 1, wherein the at least one first welding surface defines the bottom surface of the at least one axial clearance.

13. The valve according to claim 1, wherein weld projections
    a) of the dividing ring and the inner core, and/or
    b) of the dividing ring and the outer core
    that touch each other and are axially aligned with each other are arranged in the at least one axial clearance, with the weld projections forming the at least one first welding surface.

14. The valve according to claim 1, wherein the outer core and the inner core each have a radial projection, wherein the nonmagnetizable dividing ring arranged between the outer core and the inner core abuts the radial projections with a rear surface.

15. The valve according to claim 1, wherein the nonmagnetizable dividing ring is made of one piece and one type of material.

16. The valve according to claim 1, comprising the at least one axial clearance includes a first axial clearance formed in a first contact area between the nonmagnetizable dividing ring and the inner core having the at least one first welding surface that is axially recessed relative to the stop surface.

17. The valve according to claim 1, wherein the at least one axial clearance includes an axial clearance formed in the a contact area between the nonmagnetizable dividing ring and the outer core having the at least one first welding surface that is axially recessed relative to the stop surface.

18. The valve according to claim 1, wherein the at least one axial clearance is between the nonmagnetizable dividing ring and the inner core.

19. The valve according to claim 1, wherein the at least one axial clearance is between the nonmagnetizable dividing ring and the outer core.

20. The valve according to claim 1, wherein at least one axial clearance includes a first axial clearance between the nonmagnetizable dividing ring and the inner core and a second axial clearance between the nonmagnetizable dividing ring and the outer core.

21. The valve according to claim 1, wherein the bottom surface is axially recessed relative to the first welding surface.

22. The valve according to claim 21, wherein the end wall of the inner core is axially recessed relative to the first welding surface.

* * * * *